United States Patent
Wang et al.

(10) Patent No.: US 6,914,412 B2
(45) Date of Patent: Jul. 5, 2005

(54) ASSEMBLY FOR UTILIZING RESIDUAL BATTERY ENERGY

(75) Inventors: Xingwu Wang, Wellsville, NY (US); Robert Allen Fransman, Cold Brook, NY (US)

(73) Assignee: Nanoset, LLC, East Rochester, NY (US)

( * ) Notice: Subject to any disclaimer, the term of this patent is extended or adjusted under 35 U.S.C. 154(b) by 18 days.

(21) Appl. No.: 10/442,420

(22) Filed: May 21, 2003

(65) Prior Publication Data

US 2004/0232879 A1 Nov. 25, 2004

(51) Int. Cl.⁷ .............................................. H01M 10/44
(52) U.S. Cl. ..................................................... 320/103
(58) Field of Search ................................. 320/103, 116, 320/119, 121, 127, 128, 140

(56) References Cited

U.S. PATENT DOCUMENTS

| | | | |
|---|---|---|---|
| 5,631,534 A | * 5/1997 | Lewis | 320/103 |
| 5,734,258 A | * 3/1998 | Esser | 323/224 |
| 5,900,716 A | * 5/1999 | Collar et al. | 320/118 |
| 6,281,662 B1 | * 8/2001 | Flohr | 320/141 |
| 6,664,757 B1 | * 12/2003 | Gauthier et al. | 320/103 |

* cited by examiner

Primary Examiner—Edward H. Tso
(74) Attorney, Agent, or Firm—Howard J. Greenwald; Peter J. Mikesell

(57) ABSTRACT

A process for transferring electrical energy from a first electrical energy storage device to a second, rechargeable electrical storage device. In this process, the voltage in the energy storage devices are sensed and the difference in such voltages is determined. The rate of current flow from the first to the second energy storage device (and vice versa) is then repeatedly adjusted. A controller, which is preferably powered by the first and second storage devices, monitors and adjusts the voltage levels in each of such devices and the current flows between the devices.

20 Claims, 9 Drawing Sheets

ASSEMBLY FOR UTILIZING RESIDUAL BATTERY ENERGY

REFERENCE TO WORK SPONSORED UNDER A GOVERNMENT CONTRACT

This invention was made, in part, with United States Government support under contract DAAD05-99-D-7014/D.0.0012 awarded by USSOCOM (SOAL-T). The United States Government has certain rights in the invention.

FIELD OF THE INVENTION

A process and apparatus for transferring power from one power storage device to another.

BACKGROUND OF THE INVENTION

U.S. Pat. No. 5,519,312 discloses a hybrid system comprised of a fuel cell and a superconducting magnetic energy storage system ("SMES"). In the process of this patent, energy was transferred from the SMES to the fuel cell, and/or from the fuel cell to the SMES.

The device of U.S. Pat. No. 5,519,312 is adapted to store current in the SMES. However, such device is not readily adapted to store charge.

The United States is currently at war. Its soldiers carry many electrical assemblies, including, e.g., transceivers, night-vision devices, range finders, meters, guidance systems, etc. Of necessity, the electrical devices carried by the soldiers are powered by mobile power sources, the most common of which is a battery. It has been estimated that the weight of such batteries in many cases exceeds 40 percent of the weight of all the gear carried by a soldier.

Batteries have finite lives. Even before they are completely discharged, however, they often decline in power to a level at which they are no longer useful. At this stage, they are often discarded and replaced with a spare battery that also must be carried by the soldier.

It is an object of this invention to provide a process for scavenging the remaining energy in a battery to another, rechargeable battery. It is another object of this invention to provide an apparatus for effectuating such process.

SUMMARY OF THE INVENTION

In accordance with this invention, there is provided a process for transferring electrical energy from a first electrical energy storage device to a second, rechargeable electrical storage device, comprising the steps of sensing the voltage in the first electrical energy storage device, sensing the voltage in the second electrical energy storage device, determining the difference in the voltages in the first and second electrical energy storage device, flowing current from the first electrical energy storage device to the second electrical energy storage device, adjusting the rate of current flow from the first electrical energy storage device to the second energy storage device by means of a controller, providing power to the controller by means of a switch which switches the power supply to the controller from the first electrical energy storage device to the second electrical energy storage device, and from the second electrical energy storage device to the first electrical energy storage device.

BRIEF DESCRIPTION OF THE DRAWINGS

The invention will be described by reference to the drawings, in which like numerals refer to like elements, and in which.

DESCRIPTION OF THE PREFERRED EMBODIMENTS

Figure 1:
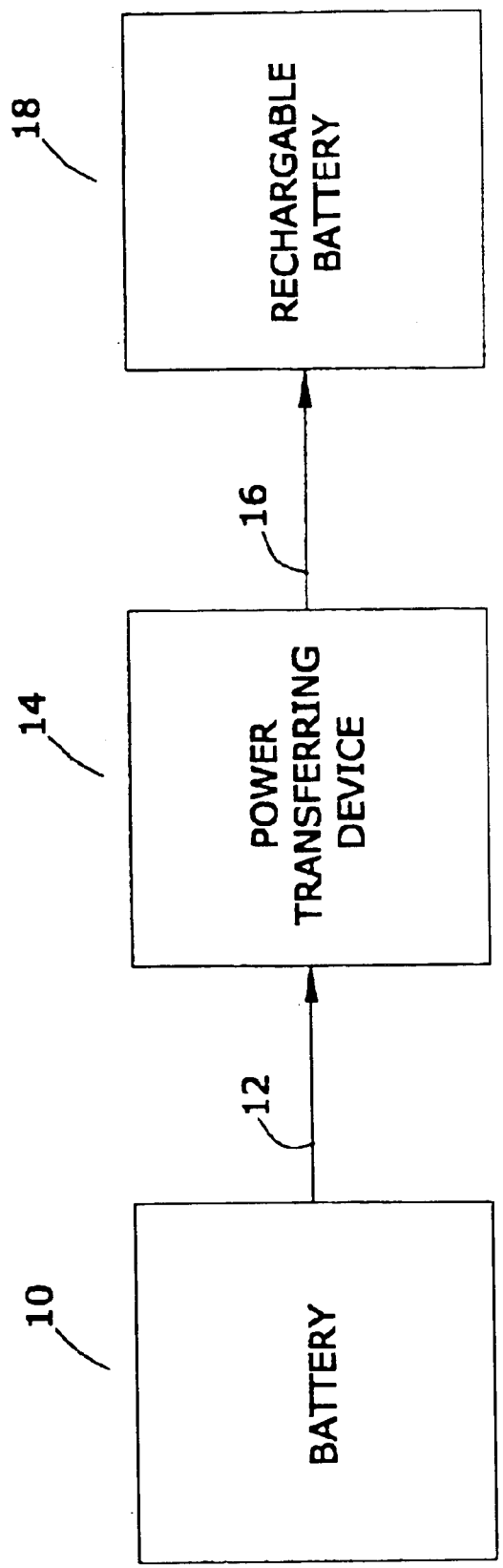
FIG. 1 is a flow diagram illustrating one preferred process of the invention.

FIG. 1 is a flow diagram of one process of the invention in which power is transferred from a battery 10 via line 12 to a power transferring device 14 that, in turn, transfers power via line 16 to a rechargeable battery 18.

Figure 2:
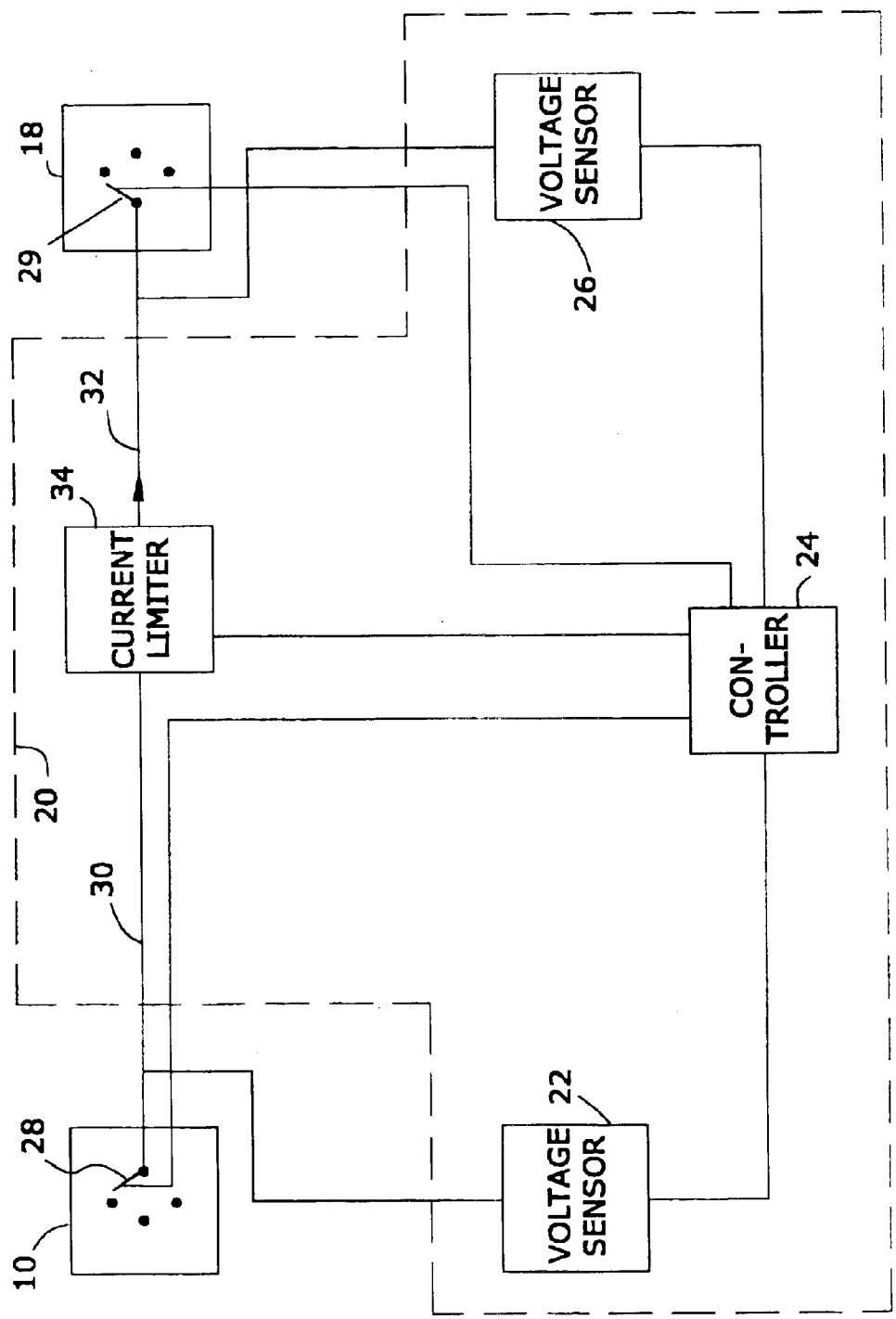
FIG. 2 is a schematic of one preferred apparatus of the invention.

FIG. 2 is a schematic illustration of one preferred device 20 of this invention, indicated in dotted line outline. Referring to FIG. 2, it will be seen that device 20 is comprised of a first voltage sensor 22 operatively connected to first battery 10. Voltage sensor 22 determines the voltage level of battery 10 and communicates this data to the controller 24. A second voltage sensor 26 measures the voltage of rechargeable battery 18 and conveys this information to the controller 24.

If the controller 24 determines that the voltage in battery 10 is higher than the voltage in battery 18, then it will cause switch 28 to close and will allow current to flow in lines 30 and 32 to rechargeable battery 18. However, current limiter 34 will limit the amount of current that is allowed to flow to battery 18 in order to avoid damaging battery 18.

In one embodiment, the current limiter 34 is a buck-boost converter that contains both inductors and capacitors. FIGS. 3, 4, 5, 6, 7, and 8 of U.S. Pat. No. 5,519,312 contain such buck-booster converters; and reference to such buck-booster converters appears at column 6 of such patent (starting at line 16) to column 7 of such patent, ending at line 50. Reference also may be had to U.S. Pat. No. 5,734,258 (bidirectional buck-boost converter), U.S. Pat. Nos. 6,037,755, 5,694,302, and the like. The entire disclosure of each of these United States patents is hereby incorporated by reference into this specification.

Referring again to FIG. 2, it will be seen that current limiter 34, in the aforementioned embodiment, slowly allows transfer of the charge from battery 10 to battery 18. As will be apparent, charge will flow from battery 10 to battery 18 as long as, and only as long as) the potential in battery 10 is higher than the potential in battery 18. One of the functions of the device 20 is to insure that such potential in battery 10 remains higher than the potential in battery 18 in order to transfer substantially all of the charge from battery 10 to battery 18.

One means of insuring that the potential in battery 10 remains higher than the potential in battery 18 is by varying the internal configurations of one or both of such batteries, as required. As is known to those skilled in the art, each such battery is comprised of a series of individual cells that may be connected to each other in series and/or in parallel; and each specific connection pattern has a specified internal resistance, voltage profile, and current profile.

Figure 3:
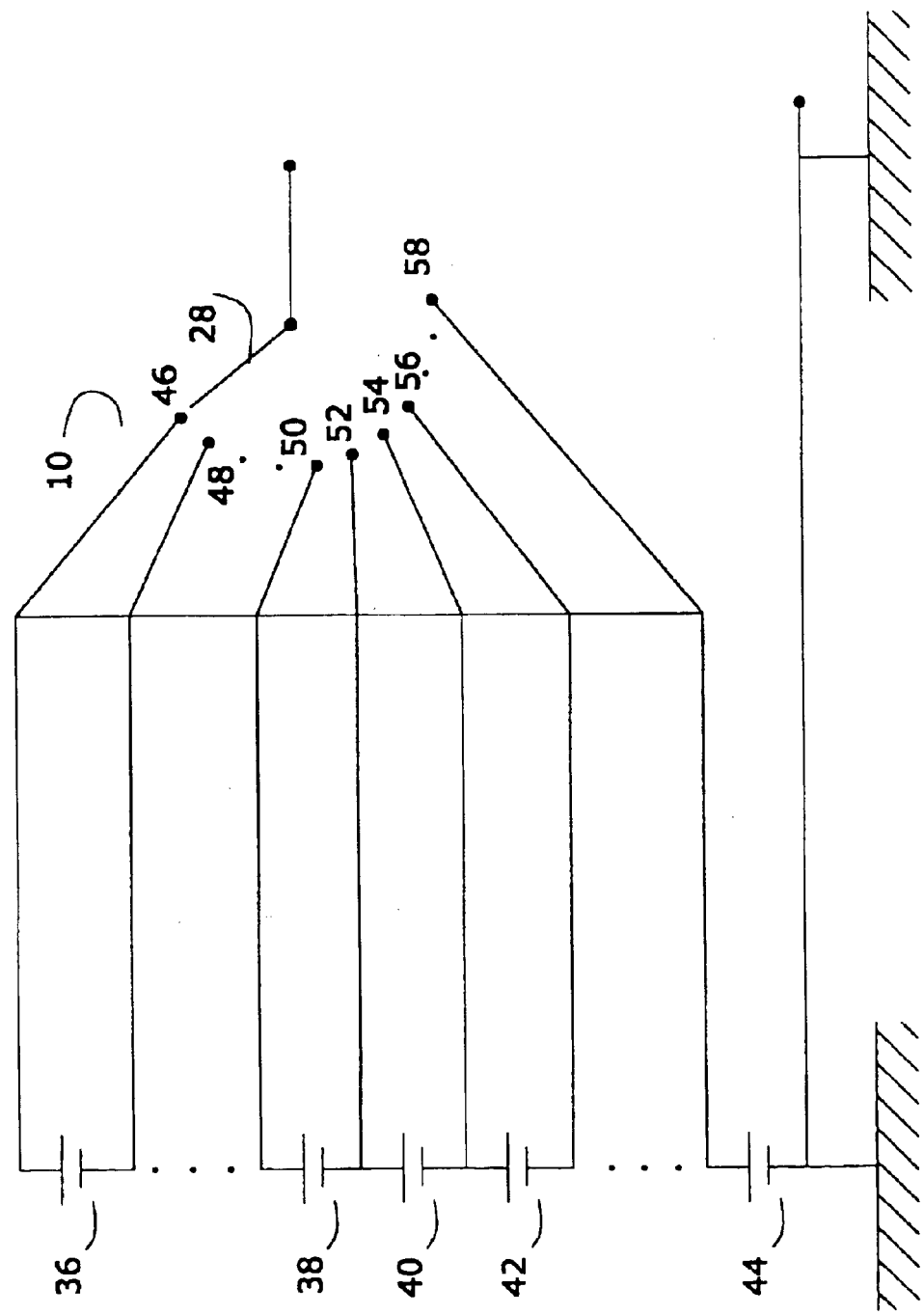
FIG. 3 is a schematic of a switching assembly that may be used in one preferred apparatus of the invention.

Referring again to FIG. 2, and in the preferred embodiment depicted therein, switch 28 is adapted to switch between several different profiles within battery 10, as is more clearly shown in FIG. 3.

Referring to FIG. 3, and in the preferred embodiment depicted therein it will be seen that battery 10 is comprised of cells 36, 38, 40, 42, 44, et seq. In general, each voltage of output of the battery 10 generally is represented by one unit cell.

Switch 28 is capable of moving between contacts 46, 48, 50, 52, 54, 56, 58, et seq. When switch 28 contacts contact 46, a circuit is created comprising all of cells 36, 38, 40, 42, and 44. When switch 28 contacts contact 48, a circuit is created similar to the prior circuit but omitting cell 36. Thus, as will be apparent, a range of different voltages can be chosen by switch 28.

Figure 4A:
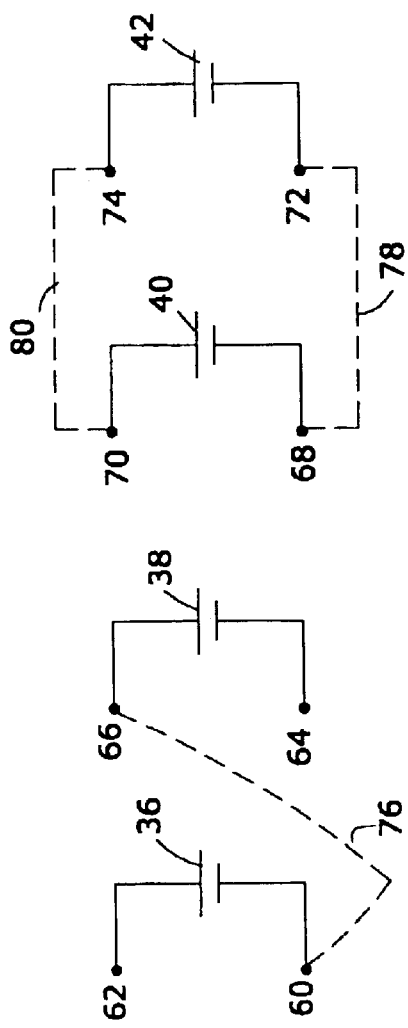
FIGS. 4A and 4B illustrate differing combinations of power supplies that may be used in the process of the invention.

Another suitable switching arrangement is illustrated in FIG. 4A, with reference to cells 36, 38, 40, and 42. In this arrangement, each of such cells is comprised of two separate terminals, terminals 60/62, 64/66, 68/70, and 72/74.

With reference to cells 36 and 38, if a connection is made with line 76, then cells 36 and 38 are connected in series. If, on the other hand, a connection is made with line 78 and 80, then cells 40 and 42 are connected in parallel.

Figure 4B:
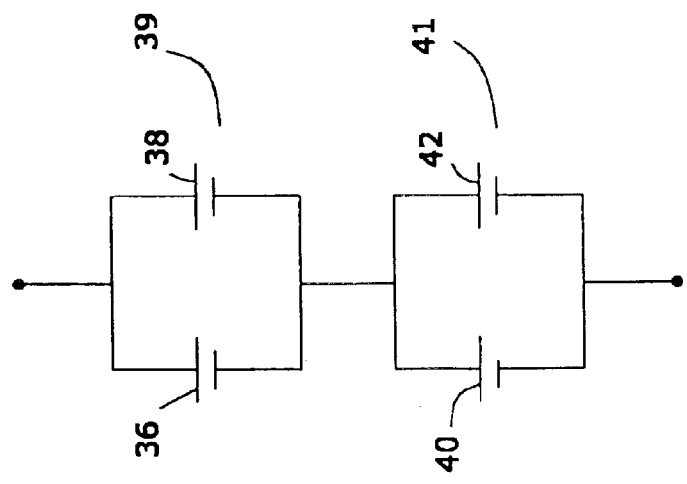

A series/parallel connection is illustrated in FIG. 4B, with reference to cells 36, 38, 40, and 42. Cells 36 and 38 are in parallel to create parallel circuit 39; cells 40 and 42 are in parallel to create parallel circuit 41; and circuits 39 and 41 are in series.

Thus, as is well known in the art, many different combinations of series circuits, parallel circuits, and series/parallel circuits can be created with "switch 28." The "switch 28" is depicted in a simplified manner, but its function is often performed by a multiplexer/demultiplexer. These devices are well known to those in the art; reference may be had, e.g., to U.S. Pat. No. 6,031,410 (multiplexer comprised of dynamic latches).

It will be apparent that, depending upon the particular profile of the cells within battery 10 and/or battery 19, the output and/or input voltages and the output and/or input currents of such cells will vary.

Referring again to FIG. 2, controller 24 preferably continually monitors batteries 10 and 18 to insure that the output voltage of battery 10 exceeds the input voltage of battery 18; when necessary to effectuate this result, it will change the internal profile of either battery 10 and/or battery 18.

In the prior section of this specification, reference was made to switch 28 changing the profile of battery 10. A similar switch/multiplexer is preferably used to change the profile of battery 18.

As mentioned hereinabove, the buck-boost converter 34 limits the amount of current flowing through line 32 into battery 18. Conventional buck-boost converters are relatively large, bulky, and cumbersome, primarily because of the relatively large size of the conventional capacitors and coils used therein.

In the instant invention, the size of buck-boost converter 34, and of the other components in device 20, is preferably reduced by the use of thin-film fabrication techniques. One may use one or more of the fabrication techniques described in patents by Bruce Van Dover. Reference may be had, e.g., to U.S. Pat. No. 6,348,705 (capacitor), U.S. Pat. No. 5,998,048 (cobalt/iron/chromium/nitrogen magnetic film), U.S. Pat. No. 5,977,582 (capacitor), U.S. Pat. No. 5,780,175 (magnetic film), U.S. Pat. No. 6,255,714 (micromagnetic device), and the like. The entire disclosure of each of these United States patents is hereby incorporated by reference into this specification.

In one embodiment, the converter 34 is a thin film fabricated current limiter 34 comprised of inductors. It is preferred that the inductors in the thin-film-fabricated current limiter 34 be magnetic thin film inductors comprised of magnetic material {s}. These inductors are well known; reference may be had, e.g., to U.S. Pat. Nos. 5,609,946, 5,750,273, 5,519,582, 6,249,039, and the like. The entire disclosure of each of these United States patents is hereby incorporated by reference into this specification.

The device 20 preferably contains shielding (not shown in FIG. 2) that prevents the transmission of electromagnetic radiation from such device. A device so shielded is illustrated in FIG. 5.

Figure 5:
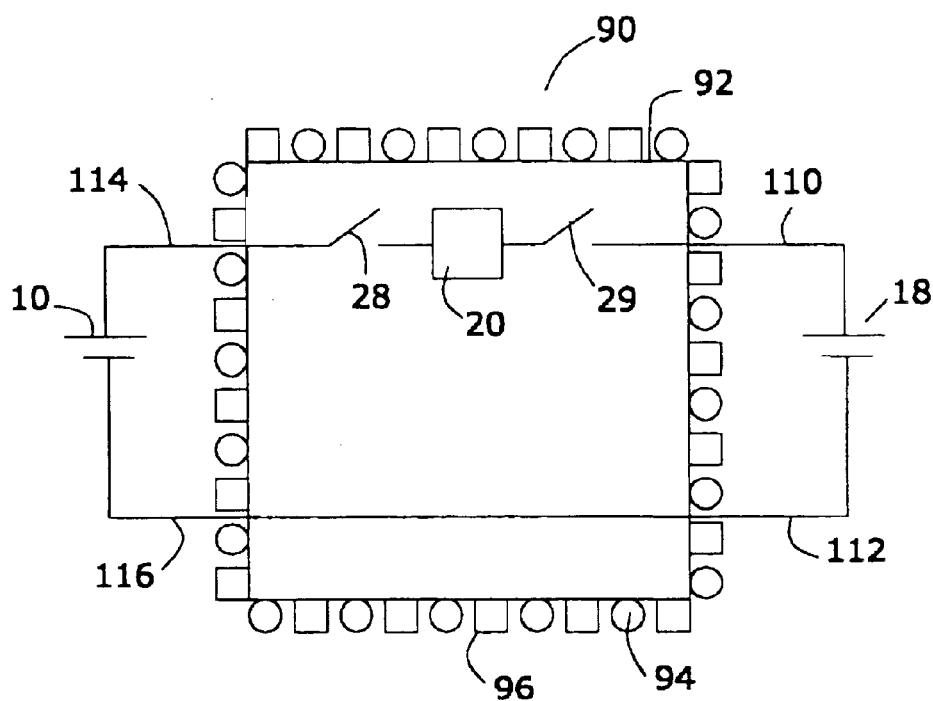
FIG. 5 is a schematic of a electromagnetically shielded device of the invention.
Figure 6:
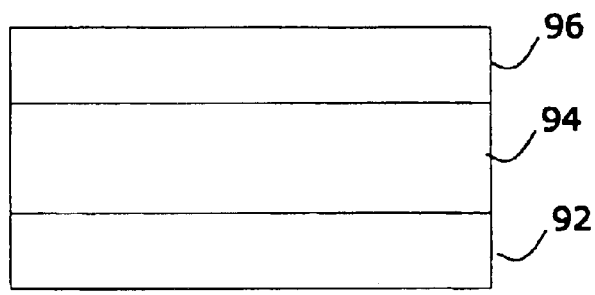
FIG. 6 is a schematic of one preferred electromagnetic shield.

Referring to FIG. 5, and in the preferred embodiment depicted therein, device 90 is comprised of a case 92 whose surface is coated with nanomagnetic and nanoelectrical particles. The nanomagnetic particles are identified as particles 94, and the nanoelectrical particles are identified as particles 96.

In general, and as is known to those skilled in the art, nanomagnetic material is magnetic material which has an average particle size less than 100 nanometers and, preferably, in the range of from about 2 to 50 nanometers. Reference may be had, e.g., to U.S. Pat. No. 5,889,091 (rotationally free nanomagnetic material), U.S. Pat. Nos. 5,714,136, 5,667,924, and the like. The entire disclosure of each of these United States patents is hereby incorporated by reference into this specification.

The nanomagnetic materials may be, e.g., nano-sized ferrites such as, e.g., the nanomagnetic ferrites disclosed in U.S. Pat. No. 5,213,851, the entire disclosure of which is hereby incorporated by reference into this specification. This patent claims a process for coating a layer of ferritic material with a thickness of from about 0.1 to about 500 microns onto a substrate at a deposition rate of from about 0.01 to about 10 microns per minute per 35 square centimeters of substrate surface, comprising the steps of: (a) providing a solution comprised of a first compound and a second compound, wherein said first compound is an iron compound and said second compound is selected from the group consisting of compounds of nickel, zinc, magnesium, strontium, barium, manganese, lithium, lanthanum, yttrium, scandium, samarium, europium, terbium, dysprosium, holmium, erbium, ytterbium, lutetium, cerium, praseodymium, thulium, neodymium, gadolinilium, aluminum, iridium, lead, chromium, gallium, indium, chromium, samarium, cobalt, titanium, and mixtures thereof, and wherein said solution is comprised of from about 0.01 to about 1,000 grams of a mixture consisting essentially of said compounds per liter of said solution; (b) subjecting said solution to ultrasonic sound waves at a frequency in excess of 20,000 hertz, and to an atmospheric pressure of at least about 600 millimeters of mercury, thereby causing said solution to form into an aerosol; (c) providing a radio frequency plasma reactor comprised of a top section, a bottom section, and a radio-frequency coil; (d) generating a hot plasma gas within said radio frequency plasma reactor, thereby producing a plasma region; (e) providing a flame region disposed above said top section of said radio frequency plasma reactor; (f) contacting said aerosol with said hot plasma gas within said plasma reactor while subjecting said aerosol to an atmospheric pressure of at least about 600 millimeters of mercury and to a radio frequency alternating current at a frequency of from about 100 kilohertz to about 30 megahertz, thereby forming a vapor; (g) providing a substrate disposed above said flame region; and (h) contacting said vapor with said substrate, thereby forming said layer of ferritic material.

By way of further illustration, one may use the techniques described in an article by M. De Marco, X. W. Wang, et al. on "Mossbauer and magnetization studies of nickel ferrites" published in the Journal of Applied Physics 73 {10}, May 15, 1993, at pages 6287–6289.

After the nanomagnetic material is coated onto the case 92, the coated assembly may be optionally heat-treated. In this optional step, it is preferred to subject the coated assembly to a temperature of from about 200 to about 600 degrees Centigrade for from about 1 to about 10 minutes.

In one embodiment, the case 92 is coated and heat treated prior to the time components 20, 28, and 29 are inserted therein.

Referring again to FIG. 5, in addition to containing nanomagnetic particles 94, the coating on case 92 also contains nanoelectrical particles 96. In one embodiment, such coating contains from about 20 to about 80 weight percent of nanomagnetic particles 94, and from about 80 to about 20 weight percent of nanoelectrical particles 96. In another embodiment, the ratios are 70/30 to 30/70. In another embodiment, the ratios are 60/40 to 40/60. In yet another embodiment, the ratios are 45/55 to 55/45.

One may make and coat these nanoelectrical particles by known means; see, e.g., U.S. Pat. No. 5,581,091, the entire disclosure of which is hereby incorporated by reference into this specification.

In general, the nanoelectrical particles have a particle size distribution similar to the nanomagnetic particles and a resistivity of from about 1.1 to about 70 microohm-centimeters. In one preferred embodiment, the resistivity of such nanoelectrical particles is from about 2 to about 3 microohms-centimeters.

The combination of the nanomagnetic particles and the nanoelectrical particles provides shielding of both electrical and magnetic fields. At least about 90 percent of the magnetic field strength and the electrical field strength is diminished by these particles.

The nanoelectrical particles may comprise, or consist essentially of, copper, aluminum, silver, gold, and mixtures thereof.

In one embodiment, only nanomagnetic particles are used to provide a shield for case 92. In another embodiment, only nanoelectrical particles are used to provide shield for case 92. In yet another embodiment, depicted in FIG. 6, adjacent layers of coating will contain either the nanomagnetic particles and/or the nanoelectrical particles. In yet another embodiment, not shown, adjacent areas of case 92 will contain either nanomagnetic particles or nanoelectrical particles. As will be apparent, multiple layers of these coatings may be used.

Figure 7:
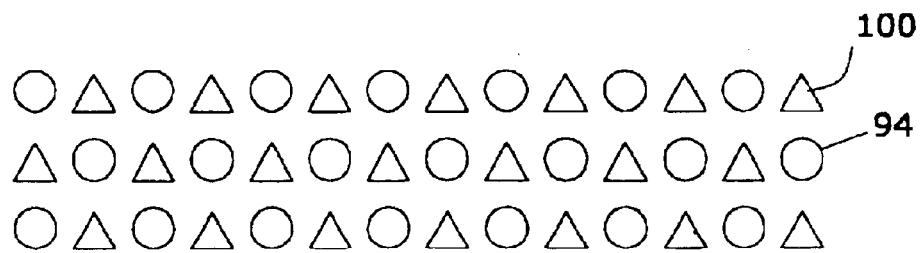
FIG. 7 is a schematic of a layer of a preferred electromagnetic shield.

In one embodiment, illustrated in FIG. 7, the interstices between adjacent nanomagnetic particles are filled with insulative material 100. This insulative material 100 preferably has a resistivity of at least from about 1,000,000,000 to about 10,000,000,000,000 ohm-centimeter.

Referring again to FIG. 5, the leads 110, 112, 114, and 116 are preferably hermetically sealed so that, if it is desired to utilize the device 90 underwater, one may do so. One may produce such hermitic sealing by conventional means such as, e.g., the method disclosed in U.S. Pat. No. 5,157,831, the entire disclosure of which hereby incorporated by reference into this specification.

Figure 8:
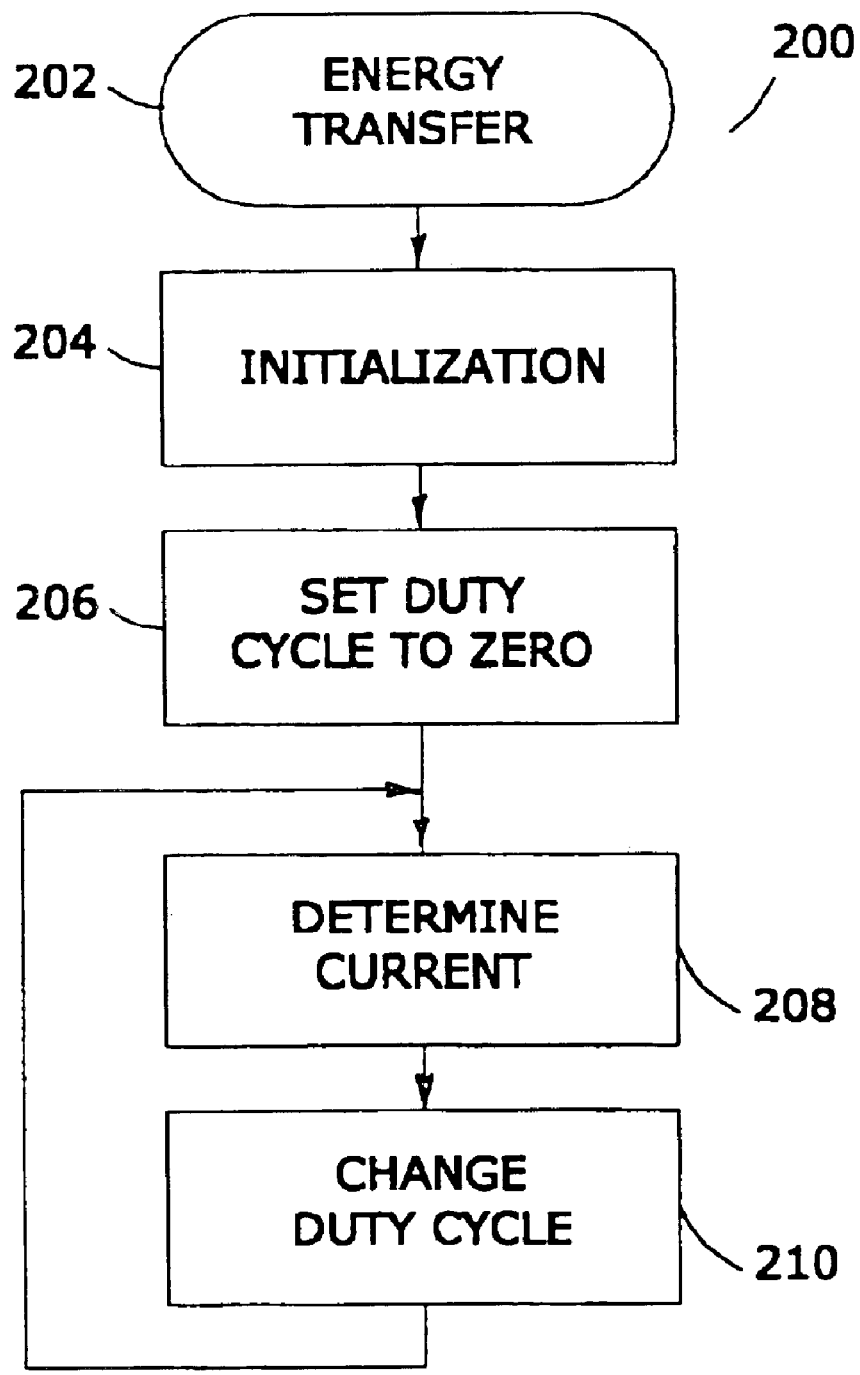
FIG. 8 is a flow diagram of one preferred process of the invention.

FIG. 8 is a schematic diagram of a preferred process utilizing one preferred device of this invention. The project that developed this process and device explored one type of primary battery and one type of secondary battery, each with two independent 12-volt cells. The primary lithium sulfur dioxide battery nominally contained 612 kilojoules (KJ) of energy, while the secondary nickel metal hydride (NiMH) battery stored about 311 KJ of energy. Testing of eight "exhausted" primary batteries showed that these "exhausted" batteries contained a total of almost 1600 KJ (equivalent to 2½ new primary batteries).

The energy scavenging prototypes developed in this project used small, low-powered microcontrollers to control a DC-DC boost circuit. One version charged at a fixed current of 360 milliamperes that matched the preferred low-rate charge for the secondary battery. The other version sped up the energy-scavenging process by raising the current, while keeping it under the 2 A internal fuse limit of the primary battery. For the operator, the two versions were electrically identical.

In order to transfer energy from a primary battery to a secondary, rechargeable battery, the process 200 depicted in FIG. 8 was preferably used. In this process, in step 202, energy transfer from the primary to the secondary battery was commenced. In step 204, the initial values of analog-to-digital conversion, the frequency of the pulse width modulation, input, and the output were set in the controller (not shown); the controller used preferably comprised a microcontroller.

In step 206, the initial duty cycle (i.e., the "on time" divided by the overall period of the pulse) of the pulse width modulation was set at zero; when it is at zero, there is no active charging. In step 208, the current flowing from the primary battery to the secondary battery was determined. In step 210, the duty cycle of the pulse width modulation was changed in accordance with the current flow determined in step 208.

Figure 9:
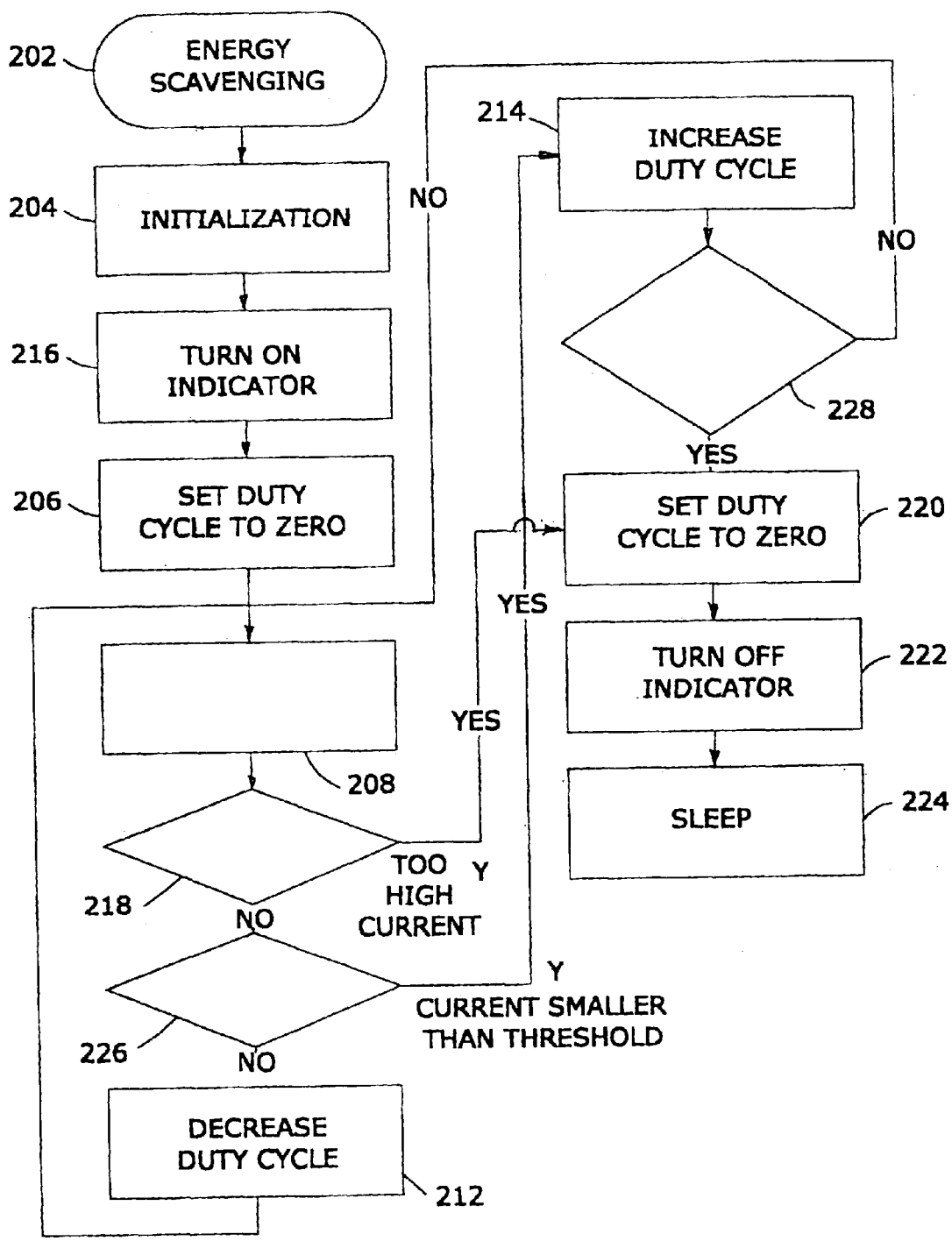
FIG. 9 is a flow diagram of another process of the invention.

FIG. 9 is a flow diagram of another, more elaborate process than that is depicted in FIG. 8. In steps 212 and 214, the step 210 (see FIG. 8) is separated into two distinct parts. Thus, in step 212, the duty cycle is decreased. By comparison, in step 214, the duty cycle is increased. Which step is effectuated, and for how long, is determined by a controller (not shown).

In step 216, an indicator/display is activated. In step 218, current flow form the primary to the secondary battery that exceeds a certain safe value is determined.

There are two current levels that are measured in the process. One of the current levels mentioned is the current safety threshold value; when this value is reached, the device is caused to go into a "sleep cycle" until operator intervention. Another of the current levels mentioned is an operational threshold value; when this value is reached, the duty cycle is changed.

Thus, and referring to FIG. 9, if the current is too high, and if it exceeds a safety threshold value, then (and only then) in step 220 the duty cycle is set to zero, in step 222 the indicator is shut off, and in step 224 the device goes into a "sleep mode" until operator intervention.

The safety threshold value may be arbitrarily set. In one embodiment, the safety threshold current value which activates these safety steps is from 0.9 to about 1.1 amperes.

In addition to determining whether a safety threshold current value is reached, the process also determines whether an operational current threshold value is reached. In this latter situation, when it occurs, the duty cycle is changed to reduce the current flow.

Thus, e.g., the operational current threshold value may be, e.g., from about 300 to about 400 milliamperes. In one aspect of this embodiment, the operational current threshold value is from about 350 to about 370 milliamperes.

Referring again to FIG. 9, if the current is smaller than the operational threshold value, then it preferably will be increased up the threshold value in step 214 by increasing the duty cycle. If the current is larger than the operational threshold value, then the duty cycle will be decreased.

Referring again to FIG. 9, and in the preferred embodiment depicted therein, in step 228 the controller will optimize the maximum duty cycle necessary to achieve the desired energy transfer in accordance with the other steps in FIGS. 8 and 9. In this step 228, if it determined that the primary battery is exhausted, then the device goes to step 220 and ceases operation. If the primary battery is not exhausted, then the device goes to step 208; and the process repeats itself.

Figure 10:
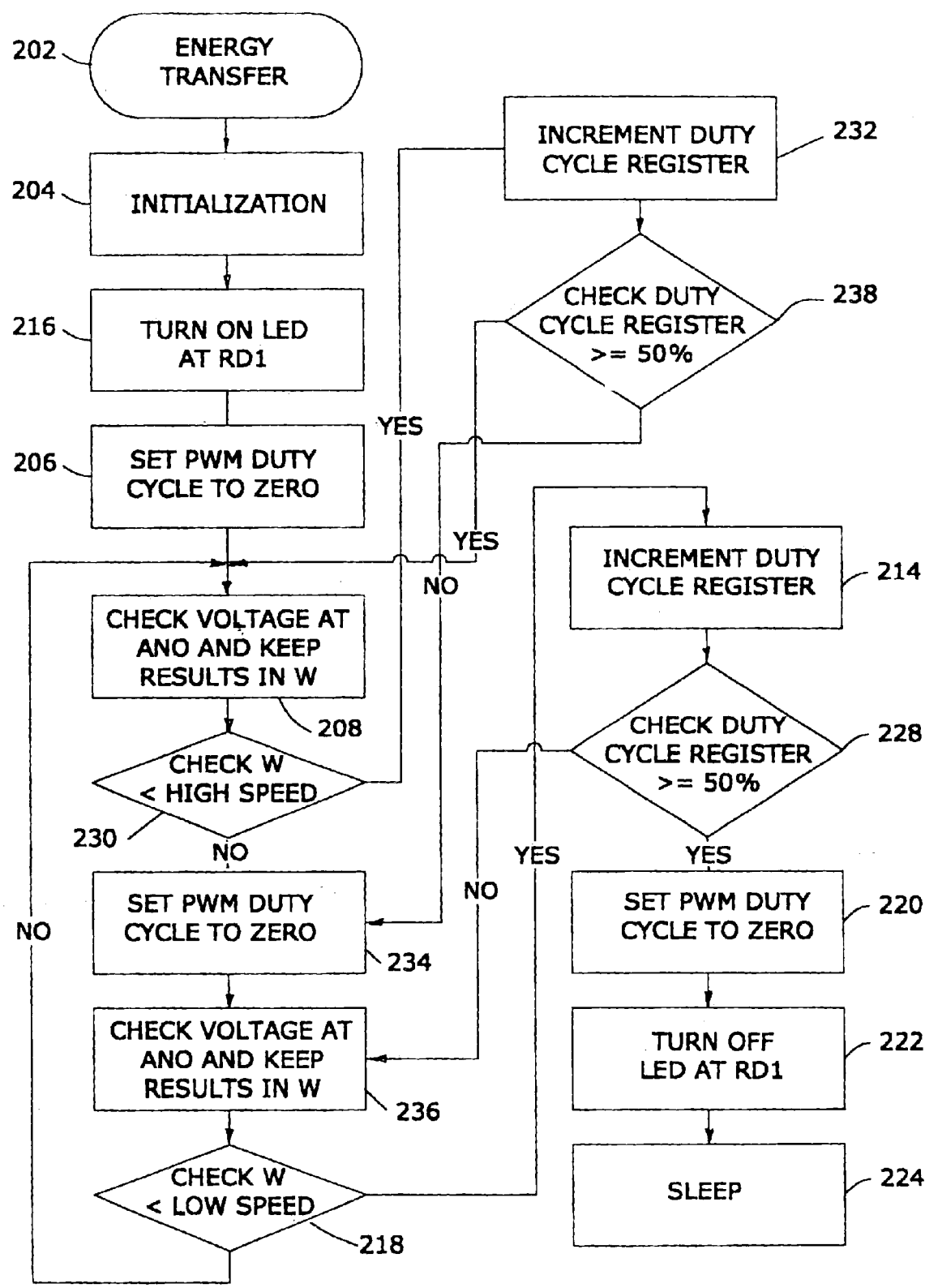
FIG. 10 is a flow diagram of a third process of the invention.

FIG. 10 is a schematic illustration of a preferred process similar to that depicted in FIGS. 8 and 9 but which also comprises several additional steps. In the process depicted therein, when the safety threshold is reached (see FIG. 9), the operation of the device is not ceased but, instead, it is controlled in accordance with steps 230 et seq.

In step 230, the current flow between the primary and the secondary device is checked. If 1 ampere or less of current is measured, then the device allows the current to continue to flow in step 232. If the current measured is more than 1 ampere, then it goes to step 234, which sets the duty cycle to zero. It will be apparent to those skilled in the art that values greater than or less than 1 ampere may be set as the "cut off value."

Thereafter, and again referring to FIG. 10, in step 236, the current flow is checked and it is determined whether the current flow is appropriate. In step 238, depending upon the current flow, the device either goes to step 208 and repeats the charging process, and/or it goes to step 234 and sets the duty cycle to zero. As will be apparent, the process may be continued either at a relatively high current, or a relatively low current.

Figure 11:
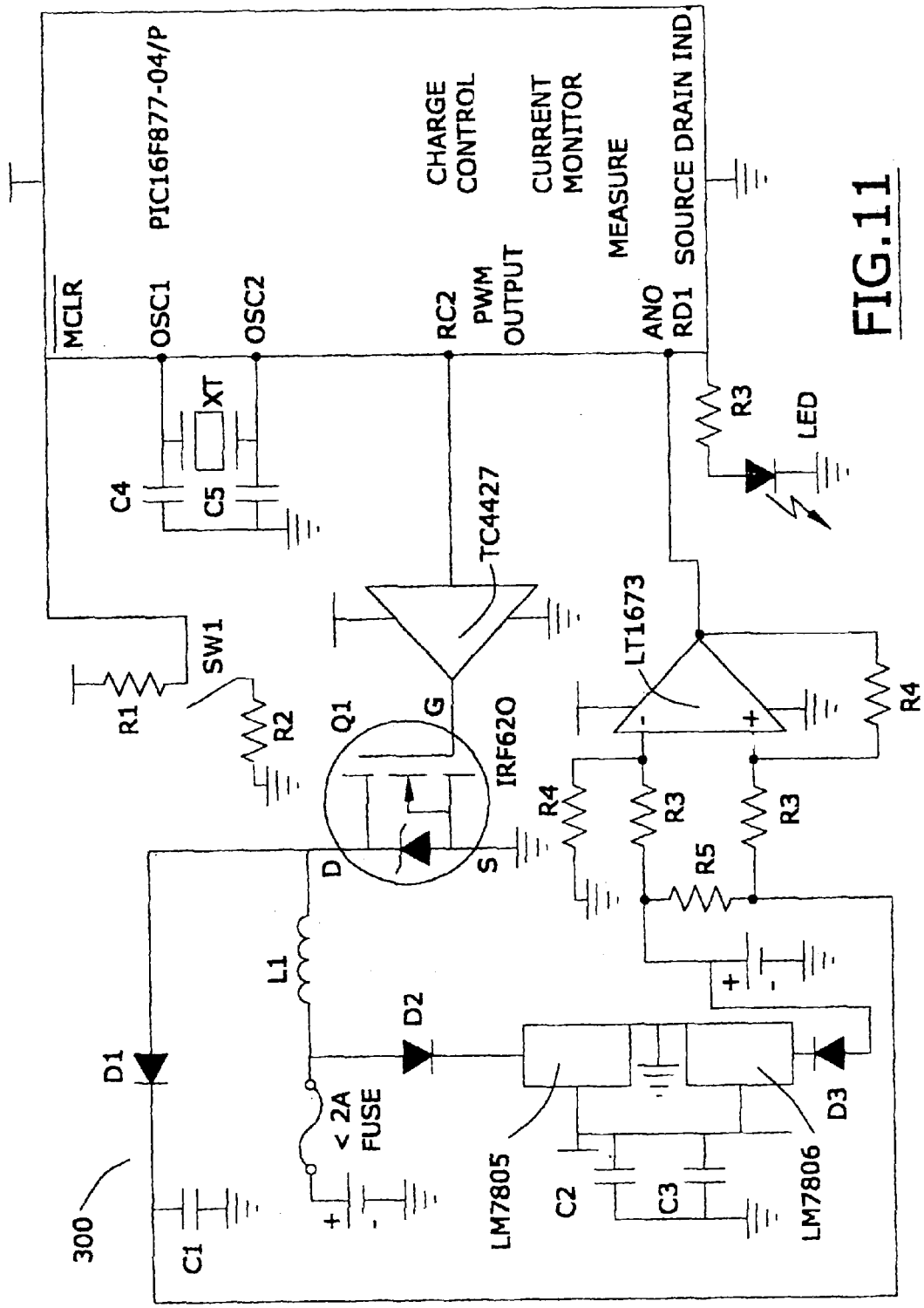
FIG. 11 is a schematic of a preferred apparatus of the invention.

FIG. 11 is a schematic diagram of one preferred device 300.

In the remainder of this specification, portions of a report CDRL A002, "Final Report for Energy Scavenging Device" (Contract DAADO5-99-D-7014/D.0012) are presented.

"Batteries are often replaced before they are completely drained. This project involved designing, constructing and testing an energy-scavenging device to reclaim energy from used or new primary batteries and transfer it to secondary batteries for use."

"The project explored one type of primary battery and one type of secondary battery, each with two independent 12-volt cells. The primary lithium sulfur dioxide battery nominally contains 612 kilojoules (KJ) of energy, while the secondary nickel metal hydride (NiMH) battery stores about 311 KJ of energy. Testing of eight "exhausted" primary batteries showed that these "exhausted" batteries contained a total of almost 1600 KJ (equivalent to 2½ new primary batteries)."

"The energy scavenging prototypes developed in this project use small, low-power microcontrollers to control a DC-DC boost circuit. One version charges at a fixed current of 360 mA that matches the preferred low-rate charge for the secondary battery. The other version speeds up the energy-scavenging process by raising the current, while keeping it under the 2 A internal fuse limit of the primary battery. For the operator, the two versions are electrically identical. Components for both versions cost under $120. The size and weight of the prototypes could be reduced by repackaging, while the component cost could be reduced by larger-scale production."

"The primary battery, BA5590B/U, is a lithium sulfur dioxide non-rechargeable battery. Its nominal weight is 2.25 lbs, and its dimensions are 5"×4.4"×2.45". The primary battery has an internal 2 A fuse, and its total nominal energy content is 612,000 J. The secondary battery, BB390A/U, is a nickel metal hydride rechargeable battery. Its nominal weight is 3.9 lbs, and its dimensions are 5"×4.4"×2.45". The total nominal energy content is 311,040 J. The secondary battery has two preferred charging options: a 360 mA slow-charge option and a faster, 10 A fast charge option. Both the primary and the secondary batteries have two independent 12 volt cells."

"A microcontroller, PIC16F877, was chosen for the device because of its small size, low power consumption, ability to be programmed for automated tasks, and ability to be powered by using a dual 7805-regulator configuration. The microcontroller controls the output via a DC-DC boost circuit based on a current sensing circuit that reads the current received by the secondary battery. An LED connected to an output of the microcontroller provides working status to the user."

"Prototype 1 is loaded with the "multi-speed" program. This program speeds up the energy scavenging process by exceeding 360 mA when possible while still staying below the 2 A fuse limit of the primary battery. The mass of Prototype 1 was 76 grams before packaging and is 327 grams after packaging. The dimensions of prototype 1 are 3.75"×2.75"×1" unpackaged, and 6"×4"×2" packaged."

"Prototype #2 is loaded with a "single speed" program. It uses the slower 360 mA charging option offered by the secondary battery because the (10 A) option would blow the 2 A fuse internal to the primary battery. The mass of Prototype #2 was 51 grams before packaging and is 207 grams after packaging. The dimensions of prototype #1 are 2.5"×2.25"×1" unpackaged and 5"×2.5"×2" packaged."

"A bias voltage is needed for the micro-controller. We designed the system so that at the beginning of the charging, the primary battery provides the bias voltage. The bias is then provided by the secondary battery towards the end of the charging. After studying the problem of switching the bias supply from the primary to the secondary battery, we tested various schemes for power switching. Currently the design relies on a method in which two 7805 chips are utilized for automatic switching over."

"Initially, test programs were written and used to spin through various PWM (pulse width modulation) duty cycles to test the operation of the boost circuit. We defined this as manual mode because we had to vary the duty cycle based on the current we monitored. In manual mode, a potentiometer is connected . . . and the output from the current sensing circuit is removed."

"Automating the process was desirable, and we explored several approaches such as using all passive components including a shunt resistor and inductive sensing. The approach chosen for the working prototypes . . . uses an active component, specifically a specialized op-amp (LT1637) designed to accept above the rail inputs. This allowed the PIC to read the voltage drop across a shunt resistor in series with the secondary battery and add a gain to the output signal delivered to the PIC. We set the gain so that a 5-volt signal represents 2 Amps of current flow to the secondary battery."

"This hardware configuration made it possible to program the PIC to monitor the output current and adjust the duty cycle accordingly. Two programs were written and used. One is the single speed program . . . while the other is the multi-speed program . . . ."

"In the single speed program the current delivered to the secondary battery was maintained at 0.36 A (charging mode I of the rechargeable battery). To reduce the charging time a multi-speed program was developed that has an initial current larger than 1 A, but still lower than the fuse rating in the primary battery (2 A) . . . . The multi-speed program adds a high-speed mode to the automation flow chart. In this mode, the program first tries to achieve a fast charge with an increased output current. After the majority of the energy in the primary battery is depleted, the output current cannot be maintained so high. The program then switches to a lower output current until the primary battery is almost completely depleted."

"In particular, the multi-speed program switches between high-speed mode and low speed mode according to the input from the current sensing circuit. As stated previously the current sensing circuit is calibrated to an output voltage of 5 Volts, which is in turn related to a current of 2 Amps flowing into the secondary battery. The voltage is read by a 10-bit analog input on the microcontroller. Since the reference voltage is measured in volts and the A/D resolution is 10, each increment of a bit indicates an increase of 5V/1024=0.005 Volts, or approximately 0.002 A of current flowing into the secondary battery. The program is setup to monitor one higher bit of the 10 bits for the high speed. When it can no longer maintain the high-speed range, the program watches a lower bit in low speed mode. Checking only one bit for each mode allows for a large operating range. For high speed, the program checks bit 8, which corresponds to a maximum of 1.022 A and a minimum of 0.512 Amps. For low speed, the program checks bit 6, which corresponds to a maximum of 0.254 A and a minimum of 0.128 Amps."

"Based on all available information, the current design would solve the problem related to energy scavenging. The essential issue is to power the device with the primary battery at the beginning of the scavenging, and with the secondary battery at the end of the scavenging. In the current design, a micro-controller is utilized to coordinate the current sensing and charging. The dual 7805-regulator configuration ensures power is available for the micro-controller at all times."

User Operating Instructions for the Prototypes

"The user should first make the correct wire connections to the energy-scavenging device. The user should then hold the reset button with one hand until making final connection to batteries with the other hand."

"Connect the primary battery to the banana jacks labeled primary battery. Connect the secondary battery to the banana jacks labeled secondary battery. (All the wires for the energy scavengers have an indication on them whether they are setup for 5,2 or 4,1. Use the wires accordingly). Release the reset button. The LED will turn on indicating that the charge has begun. When the LED goes out, the charging process is over and the user can repeat the above steps to do another battery."

Those of usual skill in the art will readily derive alternative as well as different embodiments of the above-described power transferring device as well as modifications thereof that are within the scope of the invention defined by the appended claims.

We claim:

1. A process for transferring electrical energy from a first electrical energy storage device to a second, rechargeable electrical storage device, comprising the steps of sensing the voltage in said first electrical energy storage device, sensing the voltage in said second electrical energy storage device, determining the difference in the voltages in said first and said second electrical energy storage device, flowing current from said first electrical energy storage device to said second electrical energy storage device, adjusting the rate of current flow from said first electrical energy storage device to said second energy storage device by means of a controller, providing power to said controller by means of a switch that switches the power supplied to the controller from said first electrical energy storage device to said second electrical energy storage device, and from said second electrical energy storage device to said first electrical energy storage device, and means for insuring that said voltage in said first electrical energy storage device is higher than said voltage in said second electrical energy storage device.

2. The process as recited in claim 1, wherein said first electrical storage device is a battery.

3. The process as recited in claim 2, wherein said second electrical storage device is a rechargeable battery.

4. The process as recited in claim 3, wherein a first voltage sensor senses the voltage level in said first electrical storage device.

5. The process as recited in claim 4, wherein said first voltage sensor is connected to a controller.

6. The process as recited in claim 5, wherein a second voltage sensor senses the voltage level in said second electrical storage device.

7. The process as recited in claim 6, wherein said second voltage sensor is connected to said controller.

8. An apparatus for transferring electrical energy from a first electrical energy storage device to a second, rechargeable electrical storage device, wherein said apparatus is comprised of means for sensing the voltage in said first electrical energy storage device, means for sensing the voltage in said second electrical energy storage device, a controller for determining the difference in the voltages in said first and said second electrical energy storage device, means for flowing current from said first electrical energy storage device to said second electrical energy storage device, means for adjusting the rate of current flow from said first electrical energy storage device to said second energy storage, and means for providing power to said controller by with a switch that switches the power supplied to said controller from said first electrical energy storage device to said second electrical energy storage device, and from said second electrical energy storage device to said first electrical energy storage device, and means for insuring that said voltage in said first electrical energy storage device is higher than said voltage in said second electrical energy storage device.

9. The apparatus as recited in claim 8, further comprising nanomagnetic and nanoelectrical particles wherein
  a. said nanomagnetic and nanoelectrical particles have an average particle size of less than about 100 nanometers,
  b. said nanoelectrical particles have a resistivity of from about 1.1 to about 70 microohm-centimeters.

10. The apparatus as recited in claim 8, wherein said controller is operatively configured to change said second electrical storage device from said first electrical storage device, wherein said second electrical storage device has a higher potential than said first electrical storage device.

11. The process as recited in claim 8, wherein said first electrical storage device is a battery.

12. The apparatus as recited in claim 11, wherein said second electrical storage device is a rechargeable battery.

13. The apparatus as recited in claim 12, further comprising a first voltage sensor for sensing the voltage level in said first electrical storage device.

14. The apparatus as recited in claim 13, comprising a controller connected to said first voltage sensor.

15. The apparatus as recited in claim 14, comprising a second voltage sensor for sensing the voltage level in said second electrical storage device.

16. The apparatus as recited in claim 15, wherein said second voltage sensor is connected to said controller.

17. The apparatus as recited in claim 16, further comprising a current limiter for limiting the amount of current that can flow from said first electrical storage device to said second electrical storage device.

18. The apparatus as recited in claim 17, wherein said current limiter is a buck-boost converter.

19. The apparatus as recited in claim 18, further comprising means for altering the configuration of cells disposed within said first battery.

20. The apparatus as recited in claim 19, further comprising means for altering the configuration of cells disposed within said second battery.

* * * * *